US010222209B2

(12) United States Patent
Park et al.

(10) Patent No.: US 10,222,209 B2
(45) Date of Patent: *Mar. 5, 2019

(54) MEASUREMENT EQUIPMENT (71) Applicant: Advanced Semiconductor Engineering, Inc., Kaohsiung (TW)

(72) Inventors: Seungbae Park, Vestal, NY (US); Yu-Ho Hsu, Kaohsiung (TW); Chin-Li Kao, Magong (TW); Tai-Yuan Huang, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 8 days.

This patent is subject to a terminal disclaimer.

(21) Appl. No.: 15/862,476

(22) Filed: Jan. 4, 2018

(65) Prior Publication Data

US 2018/0128612 A1 May 10, 2018

Related U.S. Application Data (63) Continuation of application No. 14/167,786, filed on Jan. 29, 2014, now Pat. No. 9,891,048.

(51) Int. Cl.
*G01C 11/02* (2006.01)
*G01C 11/04* (2006.01)
*G01B 11/245* (2006.01)

(52) U.S. Cl.
CPC ........... *G01C 11/04* (2013.01); *G01B 11/245* (2013.01); *G01B 2210/56* (2013.01)

(58) Field of Classification Search
CPC .... G01C 11/04; G01B 11/245; G01B 2210/56

USPC ........................................................ 348/92
See application file for complete search history.

(56) References Cited

U.S. PATENT DOCUMENTS

| 4,556,317 | A | 12/1985 | Sandland et al. |
|---|---|---|---|
| 4,845,373 | A * | 7/1989 | Jamieson ............... H01L 21/681 250/548 |
| 5,436,725 | A | 7/1995 | Ledger |
| 5,768,443 | A * | 6/1998 | Michael .................. G06T 5/006 382/151 |
| 6,201,600 | B1 * | 3/2001 | Sites .................. G01M 11/0264 356/124 |
| 6,335,791 | B1 | 1/2002 | Miyatake |
| 7,768,637 | B2 * | 8/2010 | Schupp ............... G01N 21/9503 356/237.5 |

(Continued)

OTHER PUBLICATIONS

Non-Final Office Action for U.S. Appl. No. 14/167,786, dated Apr. 4, 2016.

(Continued)

*Primary Examiner* — Christopher G Findley
(74) *Attorney, Agent, or Firm* — Foley & Lardner LLP (57) ABSTRACT

The measurement equipment includes a rack, a first image capturing device, a second image capturing device, a third image capturing device and a fourth image capturing device. Wherein, the first image capturing device and the second image capturing device capture an entire image of a to-be-measured object, the third image capturing device and the fourth image capturing device capture a plurality of local images of a plurality of local areas of the to-be-measured object, and the entire image and the local images and are simultaneously captured.

23 Claims, 5 Drawing Sheets

(56) References Cited

U.S. PATENT DOCUMENTS

| | | | | |
|---|---|---|---|---|
| 2003/0086616 A1* | 5/2003 | Oh | ............................ | G03F 9/7076 |
| | | | | 382/209 |
| 2010/0045955 A1 | 2/2010 | Vladimirsky et al. | | |
| 2010/0217678 A1* | 8/2010 | Goncalves | ............ | G06Q 20/203 |
| | | | | 705/22 |
| 2010/0309308 A1* | 12/2010 | Saphier | ................. | G06T 7/0004 |
| | | | | 348/92 |

OTHER PUBLICATIONS

Final Office Action for U.S. Appl. No. 14/167,786, dated Oct. 20, 2016.
Non-Final Office Action for U.S. Appl. No. 14/167,786, dated Jun. 2, 2017.
Notice of Allowance for U.S. Appl. No. 14/167,786, dated Oct. 3, 2017.

* cited by examiner

MEASUREMENT EQUIPMENT

CROSS REFERENCE TO RELATED APPLICATION

This application is a continuation of U.S. patent application Ser. No. 14/167,786 filed Jan. 29, 2014, the content of which is incorporated herein by reference in its entirety.

BACKGROUND OF THE INVENTION

Field of the Invention

The invention relates in general to a measurement equipment, and more particularly to a measurement equipment with a movable image capturing device.

Description of the Related Art

Conventional measurement equipment can analyze the deformation of a wafer. The wafer has variety of deformation modes, for example, in-plane deformation, distortion and warpage. However, conventional measurement equipment only can analyze the warpage of the wafer.

SUMMARY OF THE INVENTION

One aspect of the disclosure relates to a measurement equipment. The measurement equipment includes a rack, a first image capturing device, a second image capturing device, a third image capturing device and a fourth image capturing device. Wherein, the first image capturing device and the second image capturing device capture an entire image of a to-be-measured object, the third image capturing device and the fourth image capturing device capture a plurality of local images of a plurality of local areas of the to-be-measured object, and the entire image and the local images and are simultaneously captured.

Another aspect of the disclosure relates to a measurement equipment. The measurement equipment includes a first sensor group and a second sensor group. The first sensor group captures an entire image of a to-be-measured object for analyzing an entire deformation of the entire to-be-measured object, the second sensor group captures a plurality of local images of a plurality of local areas of the to-be-measured object for analyzing a plurality of local deformations of the local areas, and the entire image and the local images and are simultaneously captured.

Another aspect of the disclosure relates to a method of analyzing deformation of a to-be measured object. The method includes the following steps. A first sensor group captures an entire image of the to-be-measured object for analyzing an entire deformation of the entire to-be-measured object; and a second sensor group is driven to move for capturing a plurality of local images of a plurality of local areas of the to-be-measured object for analyzing a plurality of local deformations of the local areas.

BRIEF DESCRIPTION OF THE DRAWINGS

Common reference numerals are used throughout the drawings and the detailed description to indicate the same elements. The present invention will be more apparent from the following detailed description taken in conjunction with the accompanying drawings.

DETAILED DESCRIPTION OF THE INVENTION

Figure 1:
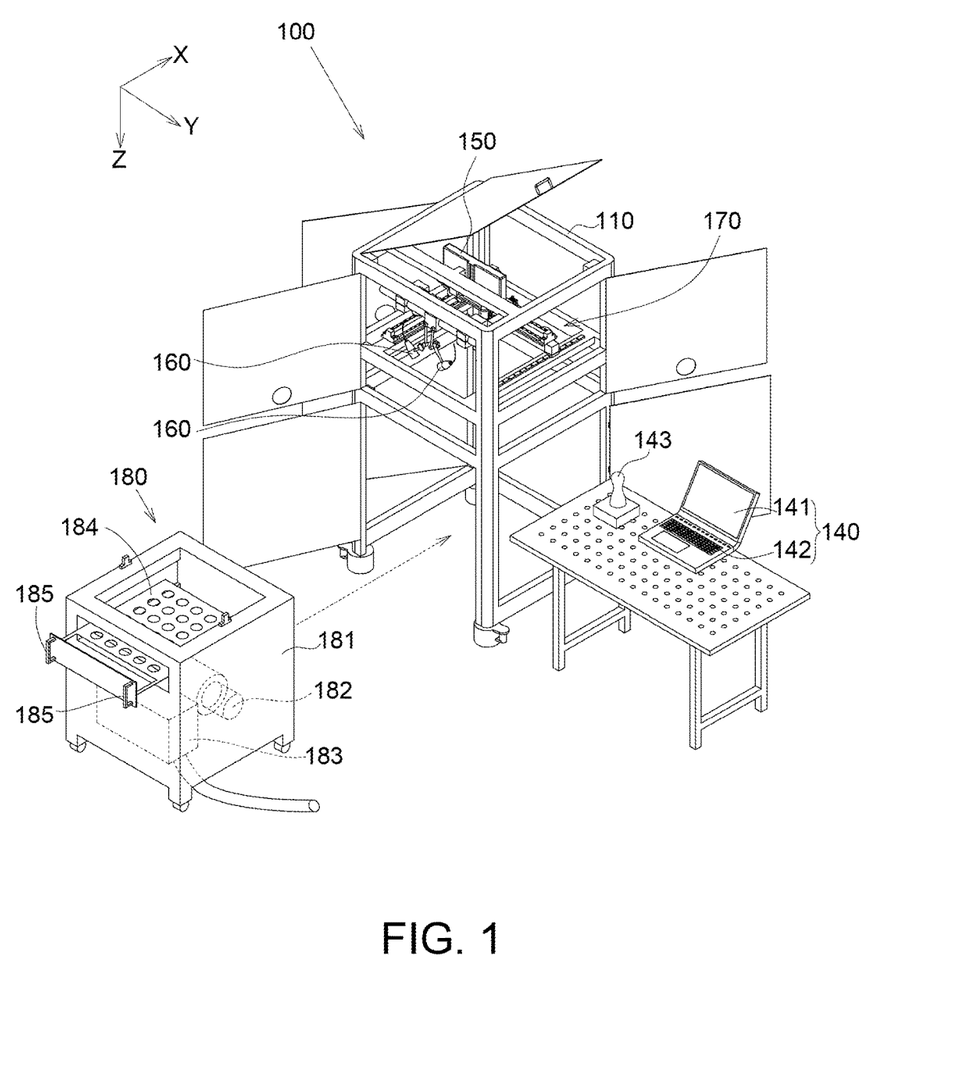
FIG. 1 illustrates a three-dimensional view of a measurement equipment according to one embodiment of the invention.

Referring to FIG. 1, a three-dimensional view of a measurement equipment according to one embodiment of the invention is illustrated. The measurement equipment 100 includes a rack 110, a first sensor 120, a second sensor 130, a computer 140, a projector 150, a plurality of light emitting device 160, a motorized linear stage 170 and an environmental chamber 180.

Figure 2:
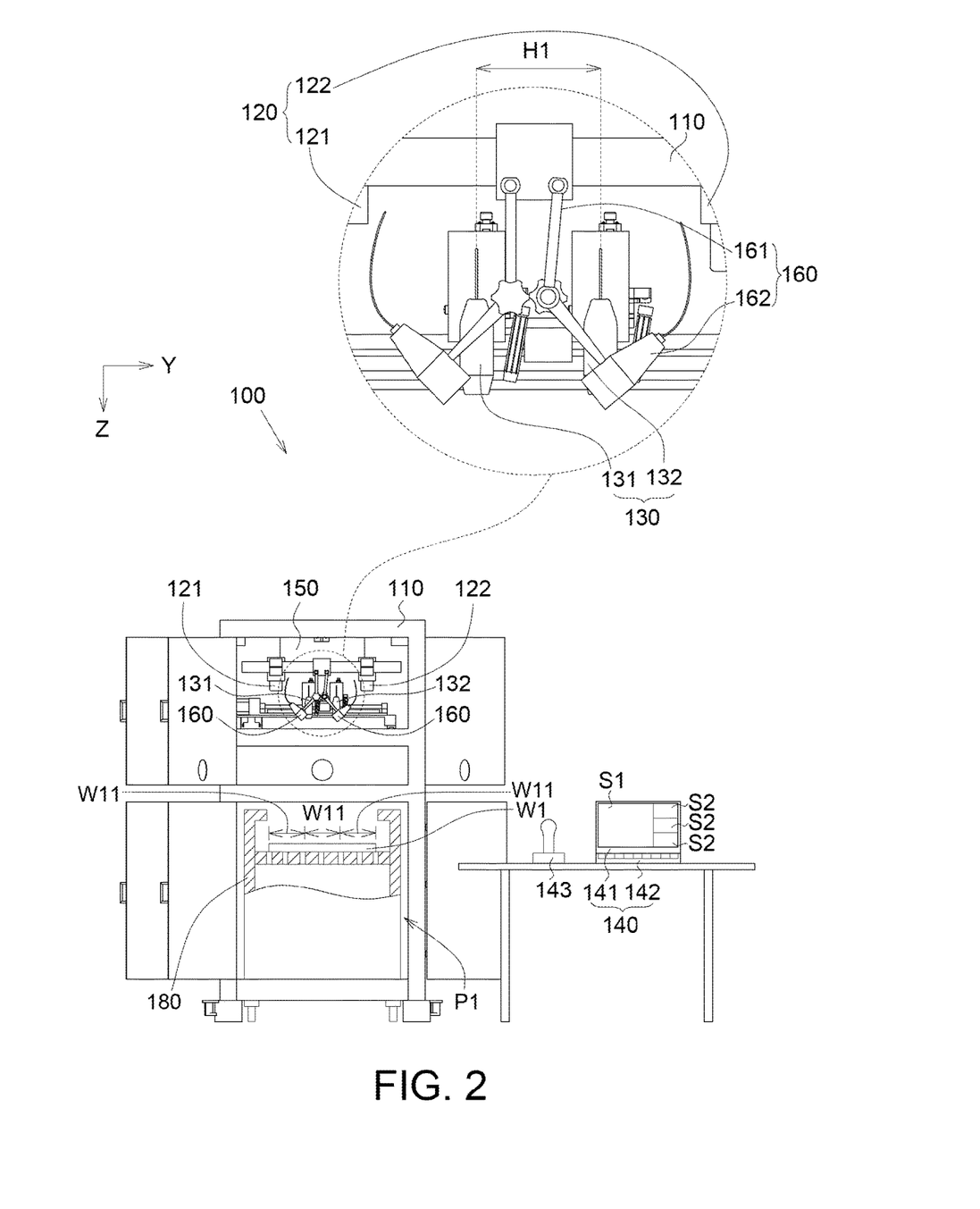
FIG. 2 illustrates a front view of the measurement equipment of FIG. 1.

Referring to FIG. 2, a front view of the measurement equipment of FIG. 1 is illustrated. The first sensor 120 disposed above the second sensor 120 can capture an entire image S1 of the entire to-be-measured object W1, such as a semiconductor wafer, for analyzing an entire deformation of the entire to-be-measured object W1. The first sensor 120 includes a first image capturing device 121 and a second image capturing device 122. The first image capturing device 121 and the second image capturing device 122 are fixedly disposed on the rack 110. The size of the entire to-be-measured object W1 is within 500 mm×500 mm, or larger than 500 mm×500 mm. In one embodiment, the first image capturing device 121 and the second image capturing device 122 are 5 mega-pixel digital cameras, for example; however, such exemplification is not meant to be for limiting.

The to-be-measured object W1 defines a plurality of local areas W11. The second sensor 130 can capture a plurality of local images S2 of the local areas W11 of the to-be-measured object W1 for analyzing a plurality of local deformations of the local areas W11. The second sensor 130 includes a third image capturing device 131 and a fourth image capturing device 132. The third image capturing device 131 and the fourth image capturing device 132 can capture the local images S2 of the local areas W11. In terms of the image having the same number of the pixels, the less the size of the image is, the larger the resolution of the local image is. Since each local image S2 of the local areas W11 is smaller than the entire image S1 of the to-be-measured object W1, the resolution of the local image S2 is larger than that the entire image S1. Accordingly, accuracy and precision of analyzing the deformation of the to-be-measured object W1 can be promoted. In one embodiment, the third image capturing device 131 and the fourth image capturing device 132 are 5 mega-pixel digital cameras, for example; however, such exemplification is not meant to be for limiting.

To prevent from the local images S2 captured by the third image capturing device 131 and the fourth image capturing device 132 are out of focus, an interval H1 between the third image capturing device 131 and the fourth image capturing device 132 is constant. In one embodiment, the interval H1 between the third image capturing device and the fourth image capturing device ranges between 100 and 160 millimeter; however, such exemplification is not meant to be for limiting.

Before the deformation of the to-be-measured object W1 is analyzed, a plurality of particles could be distributed to the to-be-measured object W1. Then, the to-be-measured object W1 is disposed within the environmental chamber 180 to be heated or cooled, and thus the to-be-measured object W1 is deformed due to the variation in temperature. Then, the first image capturing device 121 and the second image capturing device 122 capture the entire image S1, and the third image capturing device 131 and the fourth image capturing device 132 capture the local images S2 simultaneously. Then, the computer 140 can analyze the entire image S1 and the local images S2 having higher resolution to obtain deformation profiles of the to-be-measured object W1 in X-Y plane (in-plane deformation of the to-be-measured object W1), Y-Z plane (warpage of the to-be-measured object W1) and X-Z plane (warpage of the to-be-measured object W1).

The computer 140 includes a display device 141 and a control component 142. The display device 141 is electrically connected to first image capturing device 121, the second image capturing device 122, the third image capturing device 131 and the fourth image capturing device 132 for displaying the entire image S1, the local images S2 and the deformation profiles of the to-be-measured object W1. The control component 142, such as a keyboard, is electrically connected to the motorized linear stage 170 for controlling the motorized linear stage 170 to drive the third image capturing device 131 and the fourth image capturing device 132 to move. Accordingly, the third image capturing device 131 and the fourth image capturing device 132 can be controlled to capture any desired local area W11.

In another embodiment, the measurement equipment 100 further includes a joystick 143 electrically connected to the motorized linear stage 170. The joystick 143 is electrically connected to the motorized linear stage 170 for controlling the motorized linear stage 170 to drive the third image capturing device 131 and the fourth image capturing device 132 to move. Accordingly, the third image capturing device 131 and the fourth image capturing device 132 can be controlled to capture any desired local area W11.

In another embodiment, the projector 150 can project a plurality of light-spots (not illustrated) instead of the particles to the to-be-measured object W1. The light-spots are virtual (or optical) particles, and thus the pollution on the to-be-measured object W1 can be avoided.

The light emitting devices 160 can illuminate the to-be-measured object W1 for making the entire image S1 and the local images S2 clear. Each light emitting device 160 is pivotally connected to the rack 110, and thus light-emitting direction can be adjusted. Each light emitting device 160 includes an adjustable component 161 and a light-emitting component 162. The adjustable component 161 is pivotally connected to the rock 110, such that the adjustable component 161 can rotated with respect to the rock 110. The light-emitting component 162 is pivotally connected to the adjustable component 161, such that the light-emitting component 162 can rotate with respect to the adjustable component 161, and accordingly the motion range of the light emitting device 160 can be expanded.

Figure 3:
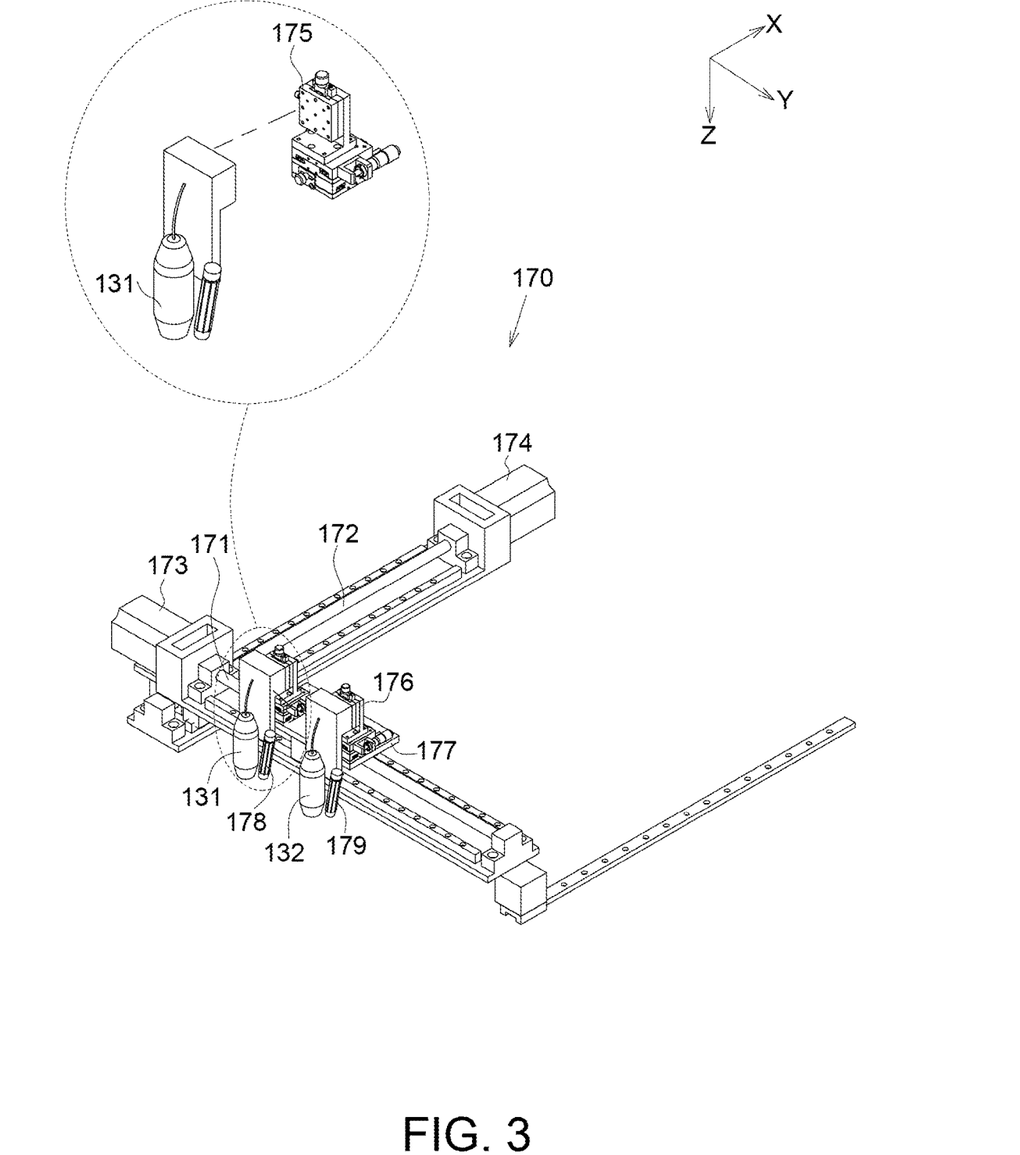
FIG. 3 illustrates a three-dimensional view of the motor driven linear stage driving devices of FIG. 1.

Referring to FIG. 3, a three-dimensional view of motorized linear stage of FIG. 1 is illustrated. In specification for the measurement equipment 100, the stroke is 500 mm, the maximum feed force is 200N, the maximum speed is 300 rpm, the repetition accuracy is +/−0.02 mm, time of reaction is less than 0.01 second, for example; however, such exemplification is not meant to be for limiting. The motorized linear stage 170 is controlled by the control component 142 or the joystick 143 to drive the first image capturing device 131 and the second image capturing device 132 to move to capture the local images S2 of the local areas W11 of the to-be-measured object W1 for analyzing the local deformations of the local areas W11. The motorized linear stage 170 includes a first rail 171, a second rail 172, a first linear motor 173 and a second linear motor 174. The first rail 171 extended along a first sliding direction, such as Y axis, can be driven to rotate by the first linear motor 173, such that the third image capturing device 131 and the fourth image capturing device 132 can move along the first rail 171.

The second rail 172 extended along a second sliding direction, such as X axis, can be driven to rotate by the second linear motor 174. The first rail 171 is movably disposed on the second rail 172, such that the third image capturing device 131 and the fourth image capturing device 132 can together move along the second sliding direction together with the first rail 171 that moves along the second sliding direction.

The motorized linear stage 170 further includes a first base 175, a second base 176 and a carrier 177. The third image capturing device 131 is fixed disposed on the first base 175 by a plurality of screws (not illustrated). The first base 175 is fixed disposed on the carrier 177 by a plurality of screws (not illustrated), such that the third image capturing device 131 is fixedly disposed on the carrier 177 through the first base 175. Similarly, the fourth image capturing device 132 is fixed disposed on the second base 176 by a plurality of screws (not illustrated). The second base 176 is fixed disposed on the carrier 177 by a plurality of screws (not illustrated), such that the fourth image capturing device 132 is fixedly disposed on the carrier 177 through the second base 176. The carrier 177 is movably disposed the first rail 171, such that the third image capturing device 131 and the fourth image capturing device 132 can be driven by the carrier 177.

The motorized linear stage 170 further includes a first position marking component 178 and a second position marking component 179, such as laser emitting components. Laser light emitted by the first position marking component 178 and laser light emitted by the second position marking component 179 can be focused on a light-point (not illustrated) in the to-be-measured object W1. Accordingly, the positions of the third image capturing device 131 and the fourth image capturing device 132 can be confirmed through the visible light-point.

Figure 4:
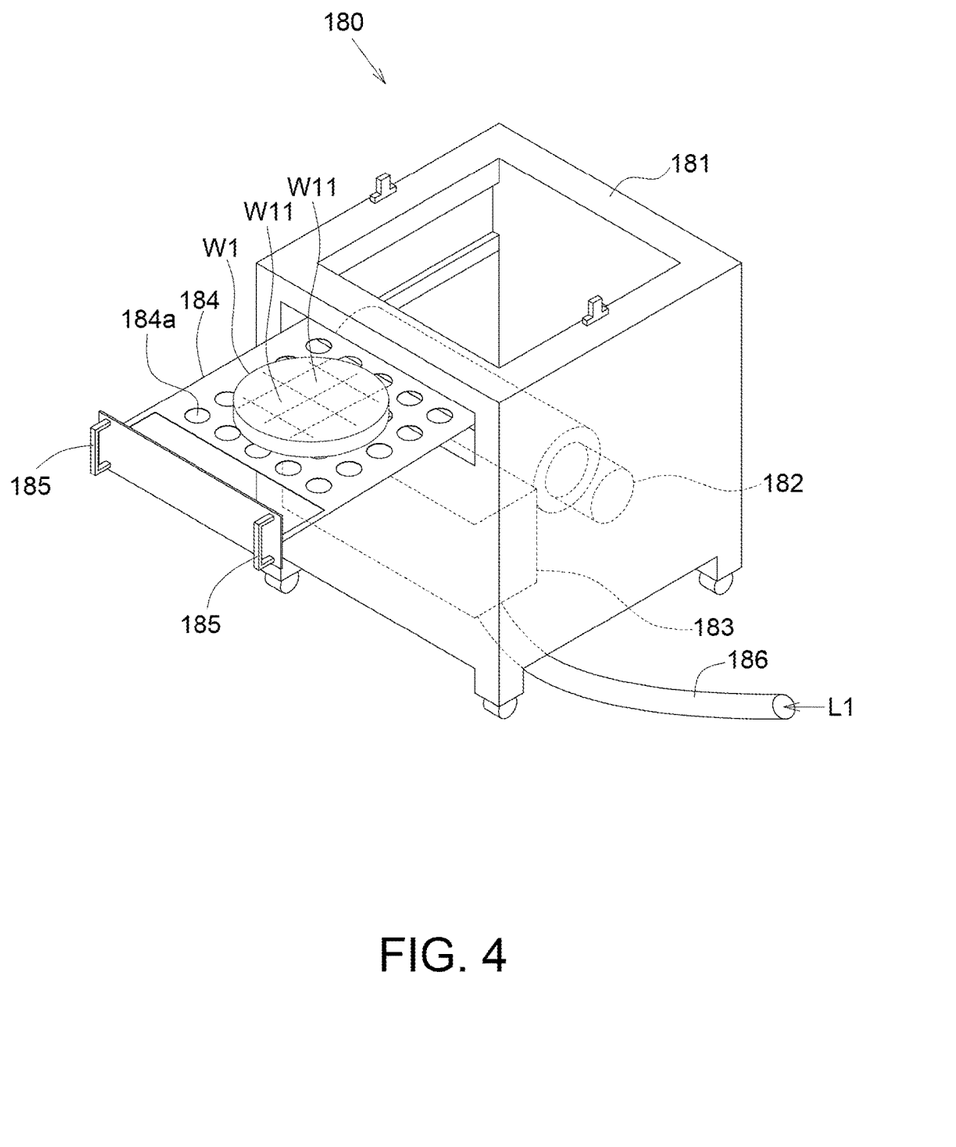
FIG. 4 illustrates a three-dimensional view of the environmental chamber of FIG. 1.

Referring to FIG. 4, a three-dimensional view of the environmental chamber of FIG. 1 is illustrated. The environmental chamber 180 is disposed within a space P1 (illustrated in FIG. 2) below the third image capturing device 131 (not illustrated in FIG. 2) and the fourth image capturing device 132 (not illustrated in FIG. 2). The environmental chamber 180 can accommodate the to-be-measured object W1. The environmental chamber 180 includes a casing 181, a heater 182, a cooler 183, a carrier 184, a plurality of handle 185 and a tube 186. The heater 182 is disposed within the casing 181 for heating the to-be-measured object W1 carried by carrier 184. The cooler 183 is disposed within the casing 181 for cooling the to-be-measured object W1 carried by carrier 184. In addition, liquid nitrogen L1 can be transmitted to the cooler 183 through the tube 186 for cooling the to-be-measured object W1. The heater 182 and the cooler 183 can be controlled by the computer 140 (illustrated in FIG. 2) to creating a manufacturing temperature ranging between −55 degrees centigrade and 300 degrees centigrade for analyzing the deformation of the to-be-measured object W1. The carrier 184 has a plurality of through holes 184a, and the heat or cooling air can be convected to the to-be-measured object W1 through the through holes 184a.

The carrier 184 is withdrawably disposed the casing 181. The handles 185 are disposed on the casing 181. It is convenient to hold the handles 185 to pull out or retract the carrier 184. When the carrier 184 is pulled out the casing 181, the to-be-measured object W1 can be disposed on the carrier 184. Since the carrier 184 is withdrawably disposed the casing 181, the carrier 184 carrying the to-be-measured object W1 can be retracted within casing 181.

Figure 5:
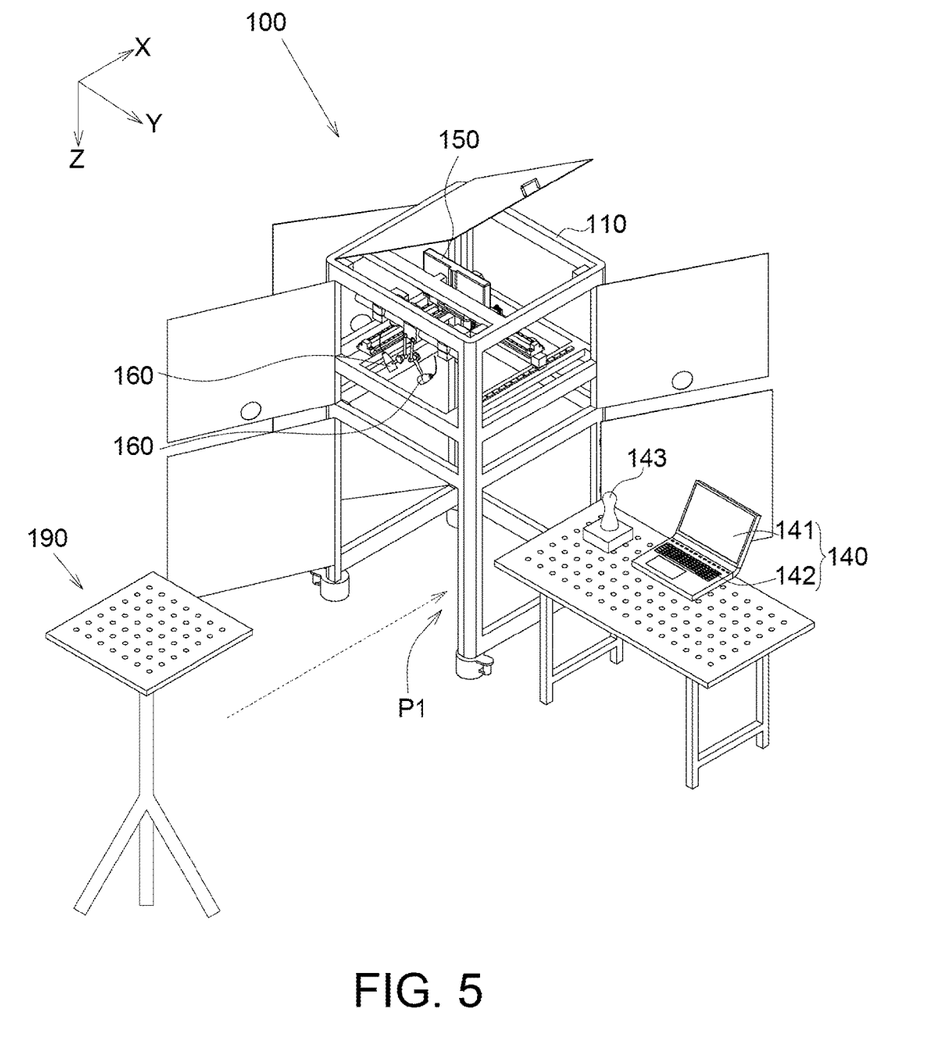
FIG. 5 illustrates a three-dimensional view of a focus correction disposed within the rack.

Referring to FIG. 5, a three-dimensional view of a focus correction disposed within the rack is illustrated. The measurement equipment 100 further includes a focus correction 190 disposed within the space P1 instead of the environmental chamber 180 when focus correction 190 corrects the focus of the third image capturing device 131 and the fourth image capturing device 132.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. The illustrations may not necessarily be drawn to scale. There may be distinctions between the artistic renditions in the present disclosure and the actual apparatus due to manufacturing processes and tolerances. There may be other embodiments of the present invention which are not specifically illustrated. The specification and the drawings are to be regarded as illustrative rather than restrictive. Modifications may be made to adapt a particular situation, material, composition of matter, method, or process to the objective, spirit and scope of the invention. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A measurement equipment comprising:
   a first camera;
   a second camera;
   a third camera; and
   a fourth camera;
   wherein the first camera and the second camera are disposed at different positions relative to a to-be-measured object;
   wherein the third camera and the fourth camera are disposed at different positions relative to the to-be-measured object; and
   wherein the first camera and the second camera are configured to capture an entire image of the to-be-measured object, the entire image of the to-be-measured object is captured by the first camera and the second camera by simultaneously focusing on the to-be-measured object, the third camera and the fourth camera are configured to capture a plurality of local images of a plurality of local areas of the to-be-measured object, and each of the local images is captured by the third camera and the fourth camera by simultaneously focusing on a corresponding one of the local areas of the to-be-measured object.

2. The measurement equipment of claim 1, further comprising a rack, wherein the first camera, the second camera, the third camera and the fourth camera are disposed on the rack.

3. The measurement equipment of claim 2, further comprising:
   a light emitting device pivotally connected to the rack.

4. The measurement equipment of claim 3, wherein the light emitting device comprises:
   an adjustable component pivotally connected to the rack; and
   a light-emitting component pivotally connected to the adjustable component.

5. The measurement equipment of claim 1, further comprising a processing device connected to the first camera, the second camera, the third camera, and the fourth camera, the processing device configured to analyze the entire image and the local images to obtain in-plane deformation, distortion and warpage of the to-be-measured object.

6. The measurement equipment of claim 5, wherein the processing device comprises:
   a control component configured to control the third camera and the fourth camera to move.

7. The measurement equipment of claim 1, wherein the first camera and the second camera are disposed above the third camera and the fourth camera.

8. The measurement equipment of claim 1, further comprising:
   a motorized linear stage configured to drive the third camera and the fourth camera.

9. The measurement equipment of claim 8, wherein the motorized linear stage comprises:
   a first rail extended along a first sliding direction, wherein the third camera and the fourth camera are movably disposed on the first rail; and
   a second rail extended along a second sliding direction, wherein the first rail is movably disposed on the second rail.

10. The measurement equipment of claim 1, further comprising:
    an environmental chamber for accommodating the to-be-measured object.

11. The measurement equipment of claim 1, further comprising:
    a joystick configured to control the third camera and the fourth camera device to move.

12. The measurement equipment of claim 1, wherein a resolution of each local image is higher than a resolution of the entire image.

13. The measurement equipment of claim 1, wherein the to-be-measured object is a wafer.

14. The measurement equipment of claim 1, further comprising:
    a projector configured to project a plurality of light-spots to the to-be-measured object.

15. A measurement equipment comprising:
    a first camera group comprising multiple cameras disposed at different positions relative to a to-be-measured object; and
    a second camera group comprising multiple cameras disposed at different positions relative to the to-be-measured object;
    wherein the cameras of the first camera group are configured to capture an entire image of the to-be-measured object, the entire image of the to-be-measured object is captured by the cameras of the first camera group by simultaneously focusing on the to-be-measured object, the cameras of the second camera group are configured to capture a plurality of local images of a plurality of local areas of the to-be-measured object, and each of the local images is captured by the cameras of the second camera group by simultaneously focusing on a corresponding one of the local areas of the to-be-measured object.

16. The measurement equipment of claim 15, further comprising a processing device connected to the first camera group and the second camera group, the processing device configured to analyze the entire image and the local images to obtain in-plane deformation, distortion and warpage of the to-be-measured object.

17. The measurement equipment of claim 15, further comprising:
   a rack;
   wherein the first camera group comprises a first camera fixedly disposed on the rack and a second camera fixedly disposed on the rack, and the second camera group comprises a third camera movably disposed on the rack and a fourth camera movably disposed on the rack.

18. A measurement equipment comprising:
   a first camera group comprising a first camera and a second camera disposed at different positions relative to a to-be-measured object; and
   a second camera group comprising a third camera and a fourth camera disposed at different positions relative to the to-be-measured object;
   wherein the first camera and the second camera are configured to simultaneously capture an entire image of the to-be-measured object, and the third camera and the fourth camera are configured to capture a plurality of local images of a plurality of local areas of the to-be-measured object; and
   wherein a resolution of the second camera group is higher than a resolution of the first camera group.

19. The measurement equipment of claim 18, further comprising a processing device connected to the first camera group and the second camera group, the processing device configured to analyze the entire image and the local images to obtain in-plane deformation, distortion and warpage of the to-be-measured object.

20. The measurement equipment of claim 18, further comprising:
   a projector configured to project a plurality of light-spots to the to-be-measured object.

21. The measurement equipment of claim 18, further comprising:
   a motorized linear stage configured to drive the second camera group;
   wherein the motorized linear stage comprises:
      a first rail extended along a first sliding direction, wherein the second camera group is movably disposed on the first rail; and
      a second rail extended along a second sliding direction, wherein the first rail is movably disposed on the second rail.

22. The measurement equipment of claim 18, wherein the entire image is captured by the first camera and the second camera by simultaneously focusing on the to-be-measured object, and each of the local images is captured by the third camera and the fourth camera by simultaneously focusing on a corresponding one of the local areas of the to-be-measured object.

23. The measurement equipment of claim 18, wherein the entire image and the local images are simultaneously captured.

* * * * *